United States Patent [19]

Kawakami et al.

[11] Patent Number: 4,474,524
[45] Date of Patent: Oct. 2, 1984

[54] SYSTEM FOR DISCHARGING THERMAL DECOMPOSITION RESIDUE CONTAINING CARBON RESIDUE AND STEEL WIRE BALLS

[75] Inventors: Shigezo Kawakami; Kunihiko Tsuji; Katuhiko Shimojima; Mitsuru Fukuda; Hiroshi Kawaguchi, all of Kobe, Japan

[73] Assignees: Kabushiki Kaisha Kobe Seiko Sho, Kobe; Mechanical Social System Foundation, Tokyo, both of Japan

[21] Appl. No.: 375,955

[22] Filed: May 7, 1982

[30] Foreign Application Priority Data

Mar. 30, 1981 [JP] Japan .................................. 56-48224
May 12, 1981 [JP] Japan .................................. 56-71971

[51] Int. Cl.³ ................................................ F23J 1/00
[52] U.S. Cl. ........................................ 414/213; 432/77; 222/152; 209/173; 202/118; 202/262; 201/25
[58] Field of Search ............... 414/211, 213, 216, 290; 432/77, 80, 83, 85; 222/152, 450; 210/800, 801, 803; 209/44.2, 163, 173; 202/117, 118, 262; 201/12, 25; 198/558, 563, 569, 625, 663, 671, 952; 110/165 R, 171

[56] References Cited

U.S. PATENT DOCUMENTS

| Re. 26,568 | 4/1969 | Sarovich | 198/563 X |
| 993,294 | 5/1911 | Edison | 198/558 X |
| 1,712,082 | 5/1929 | Koppers | 201/12 |
| 2,459,951 | 1/1949 | Metzner | 202/118 X |
| 2,731,241 | 1/1956 | Christian | 198/625 X |
| 3,933,103 | 1/1976 | Mikkelsen | 414/216 X |

FOREIGN PATENT DOCUMENTS

56-52329 5/1981 Japan .................................. 414/211

Primary Examiner—Robert G. Sheridan
Assistant Examiner—David A. Bucci
Attorney, Agent, or Firm—Oblon, Fisher, Spivak, McClelland & Maier

[57] ABSTRACT

A system for discharging a thermal decomposition residue containing carbon residue and steel wire balls, the discharge system including: a discharge mechanism including a double shaft screw conveyer having respective screws thereof supported at one end thereof and located contiguous to a residue outlet of a thermal decomposition unit, a housing hermetically connected to the residue outlet of the thermal decomposition unit and enclosing the double shaft screw conveyer with ample space on the upper side thereof; a first outlet provided in a front bottom portion of the housing for discharging the carbon residue transferred by lower portions of the double shaft conveyer; a second outlet provided at the discharging free end of the double screw conveyer for discharging the steel wire balls transferred by upper portions of the double screw conveyer; a seal provided in said first outlet for shielding the interior of the housing from ambient atmosphere; and a water-sealer including a water bath, a chute connected to the second outlet at the upper end and opened into the water bath at the lower end thereof, and a conveyor for transferring the steel wire balls dropped into the water bath through the chute to a position outside the water bath.

12 Claims, 8 Drawing Figures

SYSTEM FOR DISCHARGING THERMAL DECOMPOSITION RESIDUE CONTAINING CARBON RESIDUE AND STEEL WIRE BALLS

BACKGROUND OF THE INVENTION

1. Field of the Invention

This invention relates to a system for discharging solid residues of thermal decomposition, and more particularly to a system for classifying and cooling thermal decomposition residues after separation of gaseous and solid products resulting from pyrolytic treatment of city and industrial refuse from dry distillation or pyrolysis or other chemical processes.

2. Description of the Prior Art

The method which has heretofore been utilized most widely in cooling and discharging a thermal decomposition residue is to send the same out of a system by a chain conveyor or like transfer means after dropping the residue directly into water or after water-spraying. Such a discharge system requires the treatment of waste water, and, in a case where it is intended to utilize the recovered residue, there arise problems in that the quality of the residue is deteriorated by moisture absorption and needs a redrying treatment. Therefore, in a situation where the residue is to be recycled, for example, in a case where carbon is recovered after thermal decomposition of waste tires, it is necessary to cool and discharge the residue in a dry condition, in addition to the problem of sealing off a combustible gas atmosphere from which the residue is to be separated at high temperatures. Besides, there arises the necessity for providing some measure to ensure smooth discharge when the residue has adhesive properties or when it is irregular in shape and size and contains foreign matter.

In this connection, it has been known to use a double shaft screw conveyor for a rotary kiln, cooling the residue while it is transferred and discharged by a screw conveyor with a pair of intermeshed tandem screws which are provided with axial passages for circulation of cooling water therethrough. The screws in the tandem screw type discharge system are disposed parallel with each other and supported at opposite ends, so that the discharging operation is often deadlocked by malfunctioning of the discharging ends of the screws.

Especially, when handling residues resulting from thermal decomposition of waste tires, the steel cords and steel beads which migrate into masses of globular form within the rotary kiln are likely to cause malfunctioning or damage of the screws by getting inbetween the two screws or entwining around them at the discharging ends thereof. In some cases, the steel balls within the rotary kiln are connected in long chains which cause malfunctioning to discharge machine components such as a multiple dumper.

SUMMARY OF THE INVENTION

It is therefore an object of the present invention to provide a pyrolytic residue discharge system which will overcome the above-mentioned problems of the conventional counterparts.

It is a more specific object of the present invention to provide a pyrolytic residue discharge system which is capable of classifying and discharging pyrolytic residue containing carbon residue and steel wire balls smoothly in an efficient manner.

According to the present invention, there is provided a system for discharging thermal decomposition residues including carbon residue and steel wire balls, said discharge system comprising a discharge mechanism including a double shaft screw conveyor having the respective screws supported at one end thereof and located contiguous to a residue outlet of a thermal decomposer, and a housing hermetically connected to said thermal decomposer and enclosing the double shaft screw conveyer with an ample space on the upper side thereof, a first outlet provided in a front bottom portion of the housing for discharging the carbon residue transferred by lower portions of the double shaft screw conveyer, a second outlet provided forward of the discharging free end of said double shaft screw conveyer for discharging steel wire balls transferred by upper portions of the screw conveyor, sealing means provided in the first outlet for shielding the interior of the housing from the ambient atmosphere and a water-sealer including a water bath, a chute connected to the second outlet at the upper end and opened into the water bath at the lower end thereof, and a conveyer for transferring the steel wire balls dropped into the water bath through the chute to a position outside the water bath.

The above and other objects, features and advantages of the present invention will become apparent from the following description and appended claims, taken in conjunction with the accompanying drawings which show by way of example preferred embodiments of the present invention.

Figure 1:
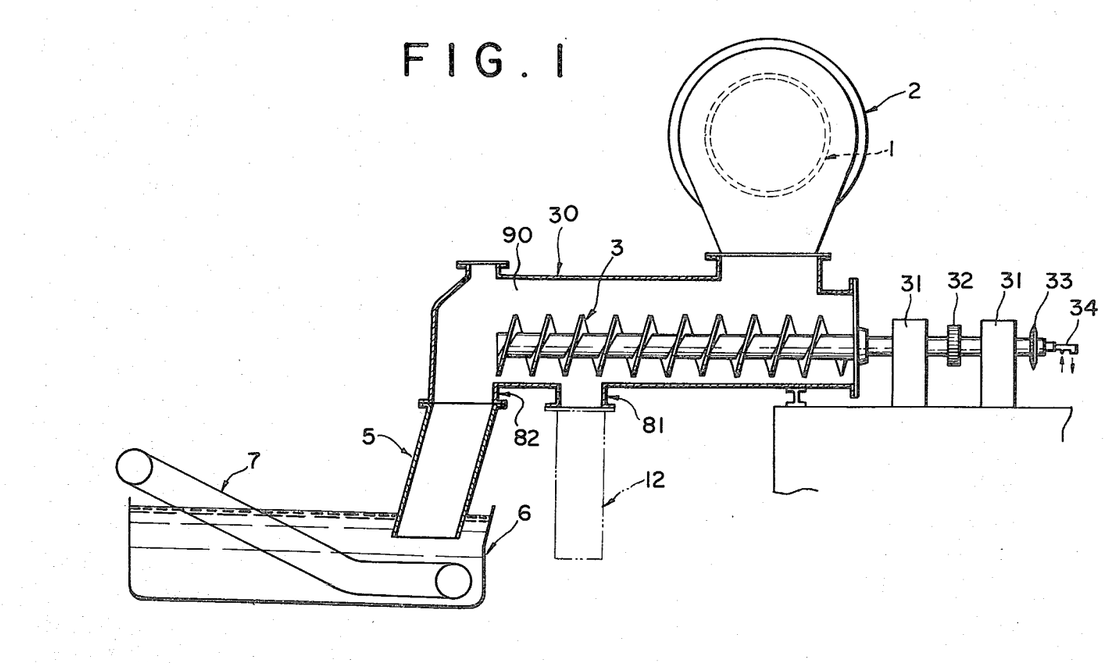
FIG. 1 is a schematic vertical sectional view of embodiment a first of the present invention.

Referring to the accompanying drawings and first to FIG. 1, there is shown a discharge system for a rotary kiln 1 for the thermal decomposition of waste material or the like, with a hood 2 around the residue discharging end thereof. The discharge system includes a housing 30 which is connected to the hood 2 and defines an ample hermetically sealed space 90 above a double shaft screw conveyor 3 which is rotatably supported in the housing 30. The screw conveyor 3 consists of a pair of intermeshed screws which are disposed perpendicular to the plane of the figure, parallel with each other, and rotatably supported at one end in bearings 31, respectively. Designated at 32 are intermeshed screw drive gears to which rotational force is transmitted from a drive source (not shown) through a sprocket 33, and at 34 is a cooling medium feed pipe which is connected to axial fluid passages in the screw conveyor 3 wherein the cooling medium such as water is fed through the feed pipe 34 to the axial fluid passages not shown in the screw conveyor 3 to cool the residue transferred by the screw conveyor 3.

The housing 30 is provided with a first outlet 81 for discharging carbon particles which are transferred by the lower portions of the screw conveyer 3, and a second outlet 82 for discharging steel wire balls tansferred by upper portions of the conveyor 3.

Figure 2:
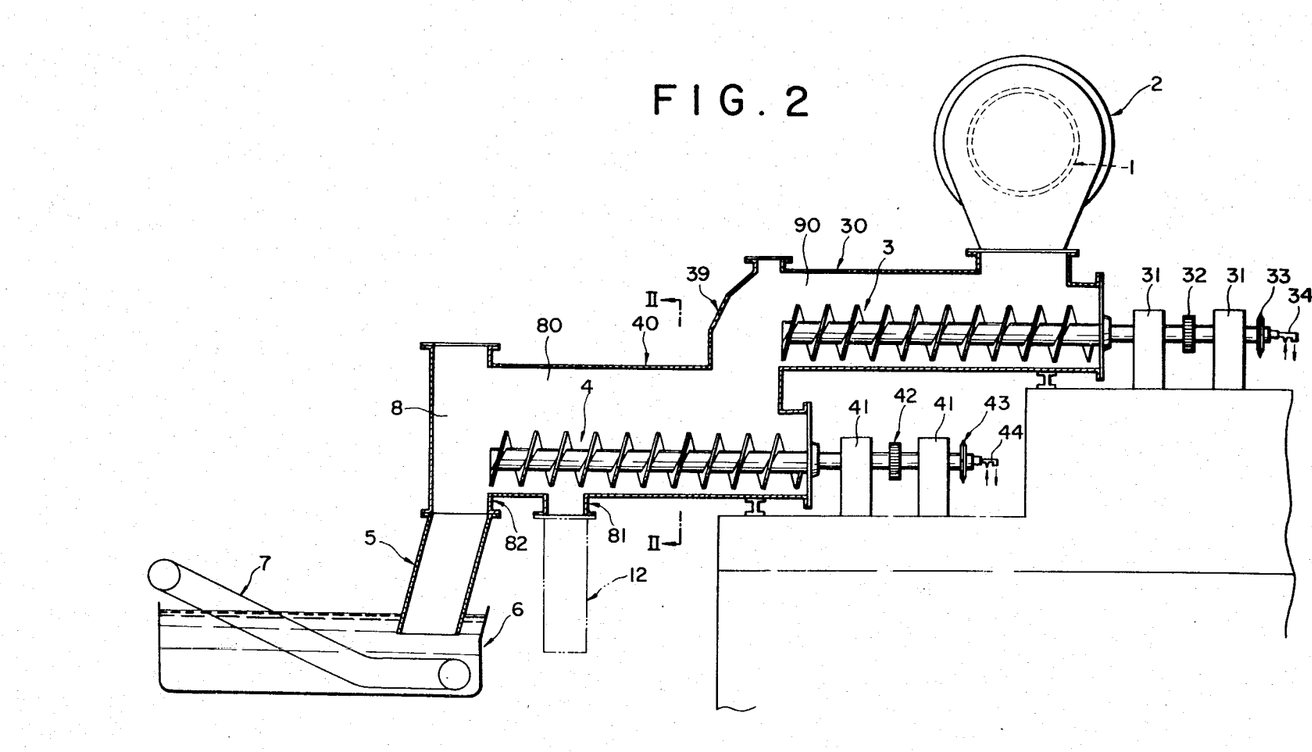
FIG. 2 is a view similar to FIG. 1 but showing a more preferred second embodiment of the invention.
Figure 3:
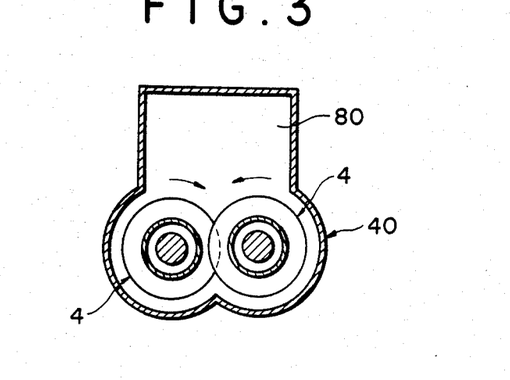
FIG. 3 is a sectional view taken along line II—II of FIG. 2.

In the embodiment shown in FIG. 2, the discharge system is further provided with a second double shaft screw conveyer 4 beneath and in series with the first double shaft screw conveyer 3 and enclosed in a housing 39 which is hermetically connected with the housing 30. Similarly to the first screw assembly 3, the second screw conveyer 4 consists of a pair of intermeshed parallel screws which are supported at one end in bearings 41, respectively, and rotated in synchronism with each other by a drive mechanism including gears 42 and a sprocket 43, receiving a cooling medium in the respective axial fluid passages from a cooling medium feed pipe 44.

The housing 40 defines an ample space 80 above the second screw conveyer 4 in communication with the space 90 above the first screw assembly 3 and the interior of the rotary kiln 1. The space 80 is also in communication with a space 8 of a discharging section which is provided at the fore end of the second screw conveyer 4, forming a second outlet 82 in its lower portion. A chute 5 which has its upper end connected to the second outlet 82 has its lower end submerged in a water bath to a depth corresponding to the internal pressure of the kiln. Reference numeral 7 denotes a conveyer for transferring the discharge material which is dropped through the chute 5 to a position outside the water bath 6.

Figure 4:
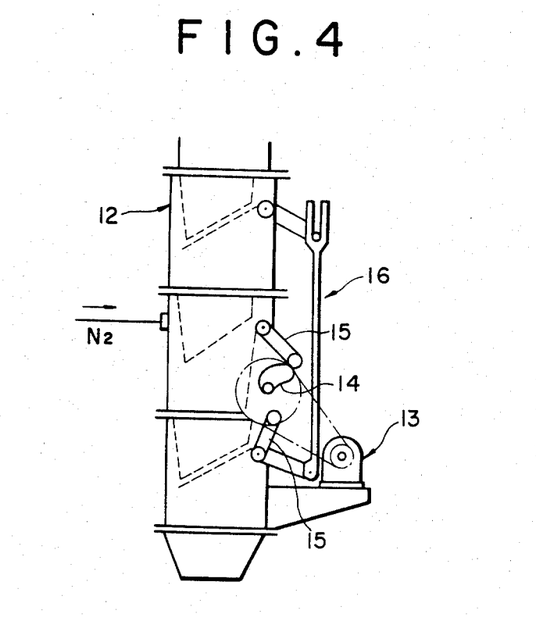
FIG. 4 is a schematic side view of a tripple dumper.

A first outlet 81 which is provided beneath a longitudinally median point of the second screw 4 is provided with a multiple dumper 12. As shown particularly in FIG. 4, the dumper 12 is for example arranged such that second and third dumper plates are opened successively by a cam machanism including arms 15 which are connected to the rotational shafts of the respective dumper plates and associated with a cam 14 which is rotatingly driven from a motor 13, closing the second dumper plate by a weight before the third dumper plate is opened. The first dumper plate is connected to the third dumper plate through a rod 16 and therefore it is opened and closed in synchronism with the latter. The rod 16 is provided with a fork-like bifurcated portion to receive therein the arm of the first dumper plate, so that the third dumper plate can be opened and closed independently even if the first dumper plate is stuck in position with foreign material, loosing its normal functions. In this sort of dumper, there is a possibility of the dumping volume of each step leaking such that it is preferable to supply an inert gas immediately upstream of the dumper plate of the second step as shown in FIG. 4, thereby suppressing the leakage of combustible gases to a possible minimal amount. The supply of the inert gas is preferred since generally a certain degree of gas leakage is unavoidable in a volumetric type discharge-system like a dumper and rotary valve combination.

In the above-described discharge system, the intermeshed screws 3 and 4 of the first and second screw conveyers are rotated towards each other. Of the residue discharged from the rotary kiln 1, those residue portions which are small in size and shape are passed between the blades or shafts of the respective screws 3 or transferred by the screw blades into lower portions of the screws 3 and conveyed towards the second screw conveyer 4. On the other hand, the residue portions of relatively large size like steel balls are conveyed by the upper portions of the screws 3 toward the second screw conveyer 4.

The second screw conveyer 4 transfers the residue toward its discharge end in the same manner as the first screw conveyer 3. Therefore, ample spaces 80 and 90 are provided above the first and second screw conveyers 3 and 4 to permit passage of large blocks conveyed by the respective screws. The discharging ends of the first and second double shaft screw conveyers are left free so that the conveyed blocks of residue are smoothly disposed therefrom without entangling or getting struck thereon. The blocks of residue which are conveyed in the upper portion of the screws 3 usually carry thereon occluded and deposited carbon particles. The carbon particles are shook off as the blocks are dropped and tumbled onto the second screw conveyer 4. The relatively small blocks which are gnawed in the first screw conveyer 3 undergo change in shape and size so that they have less possibility of being seized in the blades of the screws 4.

The particulate portions including carbon particles of the residue which has been fed to the second screw conveyer 4 are shifted downward through the rotating screw blades, discharged through the first outlet 81 and ejected through the multiple dumper in a sealed state.

The blocks of the residue including steel wire balls which are transferred in the upper portions of the screw conveyer are dropped into the chute 5, through the space 8 which is provided forward of the free end of the screw assembly 4, and transferred out of the water bath 6 by the submerged conveyer 7. If a multiple dumper or other mechanical seal is used for the discharge of steel balls, seizure of steel balls will occur in the dumping flap sections.

In this manner, the large blocks of the residue including the steel wire balls are smoothly transferred forward through the free ends of the first and second screw conveyers. The first and second screw conveyers which are provided in vertically staggered positions accelerate the separation of carbon particles from the steel wire balls, performing classifying, cooling and discharging operations smoothly in a facilitated manner. Although the screws of the first and second screw conveyers 3 and 4 should have a narrow pitch in order to prevent entwinement of the steel wire balls, there may be different pitches for the respective screw conveyers, i.e., a wide pitch for the first screw conveyer 3 and a narrow pitch for the second screw conveyer 4 for encouraging the above-mentioned effects. In such a situation, however, the second screw conveyer has a narrow pitch since the carbon particles and steel wire balls are classified by the second screw conveyer.

According to the nature and volume of the residue, more than two double shaft screw conveyers may be provided in series in the same manner as described in the foregoing discussion.

Figure 5:
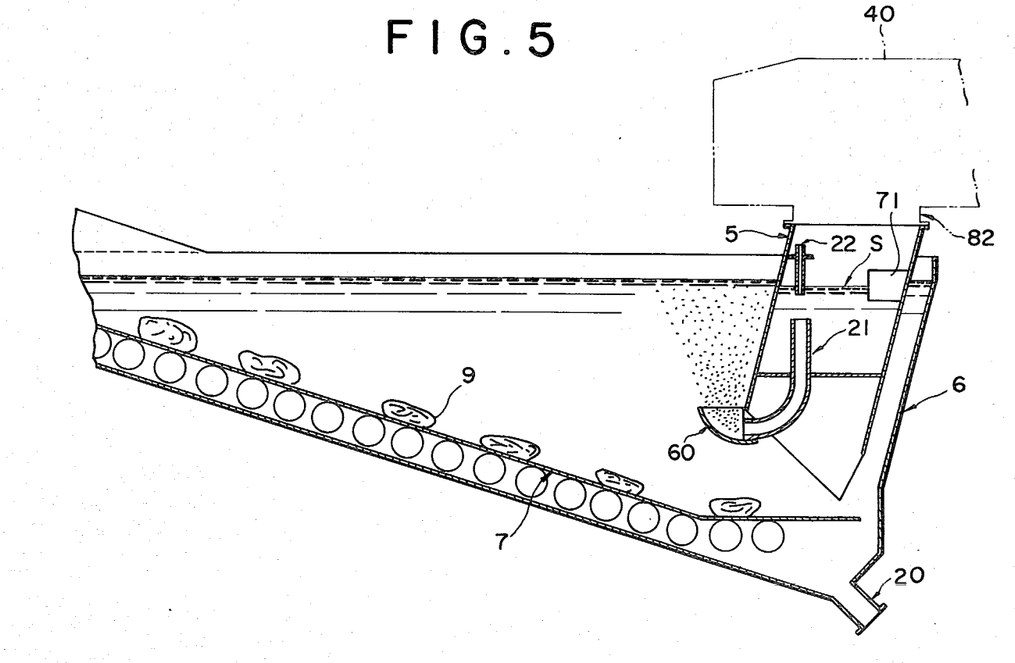
FIG. 5 is a schematic sectional view of water-sealer according to the invention.

FIG. 5 illustrates in greater detail the construction of the water-seal of the discharge system, which includes, as mentioned hereinbefore, a water bath 6, a chute 5 hermetically connected to the second outlet at the discharge end of a screw conveyer to receive steel wire balls therefrom, and a submerged conveyer 7 like a magnetic roller conveyer for transferring the discharged steel wire balls out of the water bath.

Figures 6, 7, 8:
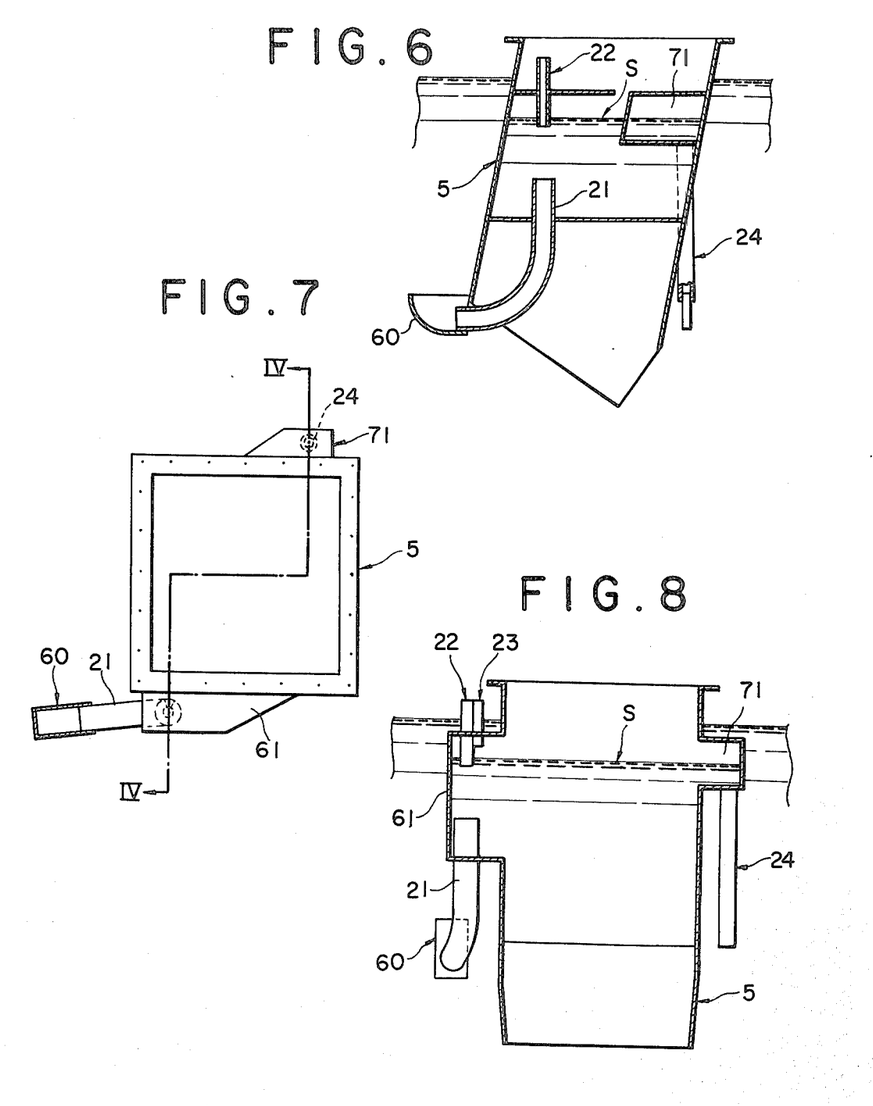
FIG. 6 is an enlarged sectional view of a chute.
FIG. 7 is a schematic plan view of the chute of FIG. 6.
FIG. 8 is a sectional view taken on line VII—VII of FIG. 7.

The particles deposited carbon on the steel wire balls 9 are shaken off as the balls are dropped through the shute 5, and float on the water surface S within the chute 5. To remove the floating carbon particles, the chute 5 is provided with float removed means. More specifically, as shown in FIGS. 6 and 7, the chute 5 is provided with laterally projecting pockets 61 and 71 in opposite side walls each provided with float collecting and discharging means. The float collecting means is constituted by a discharge pipe 21, main and auxiliary straight downcast jet nozzles 22 and 23. The discharge pipe 21 which has its upper end opened into the chute 5 is fixed in the lower portion of the pocket 61, with the other lower end opened upward at a position outside the 5 through a terminal member 60. The main and auxiliary downcast nozzles 22 and 23 which are fixed in the upper portion of the pocket 61 have the lower ends thereof disposed beneath and above the water surface, respectively. Although not shown in the drawing, the main and auxiliary straight nozzles 22 and 23 are connected to a nozzle 20 at the bottom of the water bath 6 through pipes to transfer toward the discharge pipe 21 the bath water which is supplied from the bottom nozzle 20.

On the other hand, the pocket 71 is provided with an upwardly directed jet nozzle 24 to spout water which is circulated also from the bottom nozzle or an inert gas such as nitrogen dioxide or the like.

In the above-described water-seal construction, while the steel wire balls are dropped into the water bath through the chute 5 and transferred out of the water bath 6 by the operation of the magnetic roller conveyer 7, water in the bath 6 is spurted out from the main and auxiliary downcast nozzles 22 and 23. By the action of the spurted jet, the surface water in the chute 5 is swallowed into the discharge pipe 21 and sent out of the chute 5 through the terminal member 60. Consequently, the carbon particles which float on the water surface S within the chute 5 are carried away from the chute 5 by the water jet gushing into the discharge pipe 21.

The above-described float discharging operation can be attained by the main downcast nozzle 22 alone. However, in a situation where the lower end of the main nozzle 22 is located in a shallow position under the water surface S, there is a possibility of the gases in the heated atmosphere above the water surfaces S being entrained and carried away through the discharge pipe 21 by strong water jets, and, if the water jets are weakened, the discharging water flow is destabilized with intermittent stagnation and reverse flow caused by the entrained gases.

The phenomena of intermittent stagnation and reverse flow of the discharging water due to the entrained gases can be eliminated by locating the lower end of the main nozzle 22, but the floaters on the water surface S are discharged through the pipe 21 only in an insufficiently small amount. Thus, the floater discharge capacity is largely influenced by the surface level of water S in the chute 5.

If follows that, in order to ensure stabilized operation, there should preferably be provided a main downcast nozzle 22 which has its lower end located at a position deep beneath the water surface S and arranged to spurt a water jet strong enough for stabilizing the water flow through the discharge pipe 21, in combination with an auxiliary downcast nozzle 23 which also spurts a water jet to urge the floaters on the water surface S toward the discharge water flows.

The upcast nozzle 24 produces upsurges to let the floaters on the water surface S gather in the vicinity of the straight downcast nozzles 22 and 23 to thereby enhance the efficiency of the float discharging operation. The upsurging water produced by the jet of circulated water or inert gas from the upcast nozzle 24 push the floating material on the water surface S of the pocket 71 toward the opposite side of the chute 5 and agitate the surface as a whole to facilitate drifting or solidified floaters. If desired, the upcast nozzle 24 may be replaced by a mechanical means such as a pusher operated by a piston cylinder arrangement or a sweeper using a ring belt, although the use of the upcast nozzle is more advantageous from the standpoint of maintenance, cost and space.

Since the pockets 61 and 71 of the chute 5 are provided with float discharge and transfer means, it is possible to prevent entwinement of the steel wire balls which are dropped from the double shaft screw conveyer 4. The outlet end of the discharge pipe 21 may be led to a position outside the water bath 6 to spout the collected floater material directly at that position, or may float on the surface of the water bath as shown in FIG. 5 so that the floater particles are caught on the steel wire balls 9 as the latter come up to the water surface one after another by operation of the magnetic roller conveyer 7.

As clear from the foregoing description, the pyrolytic residue discharge system according to the present invention can effectively classify and discharge the residue in sealed state, preventing entanglement of steel wire balls by a simple construction.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for discharging a thermal decomposition residue containing carbon residue and steel wire balls, said discharge system comprising:

a discharge mechanism including a double shaft screw conveyer having first and second respective screws thereof supported at one end thereof and located contiguous to a residue outlet of a thermal decomposition unit, and a housing hermetically connected to said residue outlet of said thermal decomposition unit and enclosing said double shaft screw conveyer with ample space on the upper side thereof;

first outlet means provided in a front bottom portion of said housing for discharging the carbon residue transferred by lower portions of said double shaft conveyer;

second outlet means provided at a discharging free end of said double screw conveyer for discharging the steel wire balls transferred by upper portions of said double screw conveyer;

sealing means provided in said first outlet means for shielding the interior of said housing from the ambient atmosphere; and water-sealer means including a water bath, a chute hermetically connected to said second outlet means at the upper end and opened into said water bath at the lower end thereof, and a conveyer for transferring the steel wire balls dropped into said water bath through said chute to a position outside said water bath, said water-sealed means further comprising a floater discharge pipe the intake of which is fixed in a submerged position in said chute, said floater discharge pipe leading to a position outside said chute, and a main downcast jet nozzle having a spout end thereof located in a submerged position opposite the intake of said floater discharge pipe.

2. A discharge system as set forth in claim 1, wherein said double shaft screw conveyer further comprises at least a first and second double shaft screw conveyer located in vertically and sequentially staggered positions, and wherein said first and second outlets are provided at positions beneath and forward of the discharging end portion of said second screw conveyer positioned at the most rearward end, respectively.

3. a discharge system as set forth in claim 1, wherein said sealing means in said first outlet further comprises a multiple dumper.

4. A discharge system as set forth in claim 1, wherein said water-sealer means further comprises an auxiliary, non-submerged, downcast jet nozzle operatively associated with said main jet nozzle.

5. A discharge system as set forth in claim 1, wherein said water-sealer means further comprises means in said chute but spaced from said main downcast jet nozzle for spouting upwardly a jet of water circulated from said water bath or an inert gas so as to produce upsurges which cause floaters on the surface of the water in said chute to gather in the vicinity of said main downcast jet nozzle.

6. A discharge system as set forth in claim 1, further comprising a terminal member, the lower end of said floater discharge pipe being upturned and opened into said water bath through said terminal member.

7. A discharge system as set forth in claim 1, wherein said conveyer of said water-sealer means further comprises a magnetic roller conveyer.

8. A discharge system as set forth in claim 1, wherein said double shaft screw conveyer further comprises a cooling medium feed pipe in fluid communication with a plurality of axial fluid passages which are formed in said double shaft screw conveyer.

9. A discharge system as set forth in claim 4, wherein said water-sealer means further comprises means in said chute but spaced from said main downcast jet nozzle for spouting upwardly a jet of water circulated from said water bath or an inert gas so as to produce upsurges which cause floaters on the surface of the water in said chute to gather in the vicinity of said main downcast jet nozzle.

10. A discharge system as set forth in claim 4, further comprising a terminal member, the lower end of said floater discharge pipe being upturned and opened into said water bath through said terminal member.

11. A discharge system as set forth in claim 2, wherein said double shaft screw conveyer further comprises a cooling medium feed pipe in fluid communication with a plurality of axial fluid passages which are formed in said double shaft screw conveyer.

12. A system for classifying and discharging a thermal decomposition residue containing relatively small carbon residue and relatively large non-carbon residue, said discharge system comprising:
(a) a housing having an inlet adapted to be hermetically connected to the residue outlet of a thermal decomposition unit;
(b) a double-shaft screw conveyer comprising two intermeshed, generally horizontal screws mounted for rotation in said housing, the upstream ends of said two screws being disposed beneath said inlet of said housing, said two screws being supported at the upstream ends thereof but being unsupported at the downstream ends thereof, said two screws being spaced such that the relatively small carbon residue passes downwardly between said two screws but the relatively large non-carbon residue cannot pass downwardly between said two screws;
(c) means for rotating sad two screws in opposite directions, whereby the residue is moved longitudinally along said double-shaft screw conveyer in said housing with the relatively large non-carbon residue on top of said double-shaft screw conveyer and at least most of the relatively small carbon residue beneath said double-shaft screw conveyer;
(d) a first outlet provided in said housing beneath the downstream end of said double-shaft screw conveyer for discharging at least a large part of the relatively small carbon residue;
(e) a second outlet provided immediately beyond the unsupported downstream end of said double-shaft screw conveyer for discharging the relatively large non-carbon residue, said second outlet being positioned to receive the relatively large non-carbon residue as it falls off the unsupported downstream end of said double-shaft screw conveyer;
(f) sealing means provided in said first outlet for shielding the interior of said housing from the ambient atmosphere and for minimizing the escape of the atmosphere within said housing;
(g) a water bath;
(h) an enclosed chute hermetically connected to said second outlet, the outlet of said enclosed chute being beneath the level of the water in said water bath during use of said system; and
(i) a conveyer for transferring the relatively large non-carbon residue dropped into said water bath through said chute to a position outside said water bath.

* * * * *

UNITED STATES PATENT AND TRADEMARK OFFICE
CERTIFICATE OF CORRECTION

PATENT NO. : 4,474,524

DATED : Oct. 2, 1984

INVENTOR(S) : Kawakami et al.

It is certified that error appears in the above-identified patent and that said Letters Patent is hereby corrected as shown below:

In column 1, lines 7 and 15, delete "1." and "2." before subheadings;

In column 2, lines 33-34, should read -- view of a first embodiment of --;

In column 2, line 39, change "tripple" to -- triple --;

In column 2, line 47, insert heading, "DETAILED DESCRIPTION OF THE PREFERRED EMBODIMENTS";

"conveyor" all occurances should be -- conveyer --;

In column 3, line 50, change "loosing" to -- losing --;

In column 4, line 16, change "shook off" to --shaken off --;

UNITED STATES PATENT AND TRADEMARK OFFICE
CERTIFICATE OF CORRECTION

PATENT NO. : 4,474,524                    Page 2 of 2
DATED      : Oct. 2, 1984
INVENTOR(S) : Kawakami et al.

It is certified that error appears in the above-identified patent and that said Letters Patent is hereby corrected as shown below:

In column 4, line 20, change "they have less possibility" to -- there is less possibility --;

In column 4, line 68, change "shute" to -- chute --;

In column 5, line 2, change "shute" to -- chute --;

In column 5, line 12, insert "chute" before "5";

In column 5, line 43, change "surfaces" to -- surface --;

In column 5, line 55, insert "surface" after -- water --;

In column 5, line 57, change "If" to -- It --;

In column 6, line 3, change "push" to --pushes --;

In column 6, line 6, change "agitate" to -- agitates --;

In column 6, line 6, change "or" to -- of --;

In column 7, line 14, change "a" to -- A --.

Signed and Sealed this

Sixteenth Day of April 1985

[SEAL]

Attest:

DONALD J. QUIGG

Attesting Officer    Acting Commissioner of Patents and Trademarks